United States Patent [19]

Lehle

[11] Patent Number: 4,777,837

[45] Date of Patent: Oct. 18, 1988

[54] POWER SHIFTABLE TRANSMISSION FOR VEHICLE

[75] Inventor: Hubert Lehle, Meckenbeuren, Fed. Rep. of Germany

[73] Assignee: Zahnradfabrik Friedrichshafen, AG., Friedrichshafen, Fed. Rep. of Germany

[21] Appl. No.: 19,229

[22] PCT Filed: Jun. 7, 1986

[86] PCT No.: PCT/EP86/00343

§ 371 Date: Mar. 3, 1987

§ 102(e) Date: Mar. 3, 1987

[87] PCT Pub. No.: WO87/00254

PCT Pub. Date: Jan. 15, 1987

[30] Foreign Application Priority Data

Jul. 6, 1985 [WO] World Int. Prop. O. ............ PCT/EP85/00331

[51] Int. Cl.⁴ .................................................. F16H 3/08
[52] U.S. Cl. ......................................... 74/360; 74/333
[58] Field of Search ........................... 74/333, 359, 360

[56] References Cited

U.S. PATENT DOCUMENTS

| 2,991,661 | 7/1961 | Rambausek ............... 74/360 X |
| 3,301,079 | 1/1967 | Fletcher et al. ........... 74/360 X |
| 3,682,019 | 8/1972 | Hoyer et al. ............... 74/360 X |
| 4,023,418 | 5/1977 | Zenker ..................... 74/360 X |
| 4,226,135 | 10/1980 | Winter ..................... 74/360 X |
| 4,579,015 | 4/1986 | Fukui ....................... 74/329 |
| 4,580,459 | 4/1986 | Zenker et al. ............. 74/359 |

FOREIGN PATENT DOCUMENTS

| 0083747 | 7/1983 | European Pat. Off. . |
| 0129341 | 12/1984 | European Pat. Off. . |
| 2220729 | 11/1973 | Fed. Rep. of Germany ........ 74/360 |

Primary Examiner—Dirk Wright
Attorney, Agent, or Firm—Zalkind & Shuster

[57] ABSTRACT

A transmission is provided for transfering power from an input shaft to an output shaft in a large number of ratios derived by the use of main gear groups, a range gear group and a reversing gear. Power is provided by either of two power paths thus making possible shifting under load. A friction clutch selects one or the other of the power paths and synchronizing clutches select which of a plurality of ratios will be provided by the selected path. While driving in one path, the next ratio is selected in the other path and at a selected time power is shifted from one path to the other. Because the transmission provides several ranges of ratios and several ratios in each range including a reverse in each ratio, a vehicle using this transmission may be used for a plurality of tasks and be efficient at each. By using duplicate parts and multiple shafts the transmission can be provided in a compact size and at a reduced cost.

18 Claims, 3 Drawing Sheets

POWER SHIFTABLE TRANSMISSION FOR VEHICLE

BACKGROUND OF THE INVENTION

The invention relates to a transmission for motor vehicles with internal combustion engines, especially farm tractors. In such a transmission it is possible to shift under load from one speed to another speed, an during a change of speed to transfer uninterrupted power from the drive shaft.

In known transmissions of this type (German OS 32 28 353, FIG. 3) friction clutches are disposed on two secondary shafts between a secondary shaft and a main gear group and a secondary of an inner gear group. The two friction clutches must be large enough to transmit torque of the drive motor increased by the torque transmission of the first or second gear step of the main gearing group.

BRIEF DESCRIPTION OF THE PRESENT INVENTION

The object of the invention is to provide a power shiftable transmission for vehicles, especially farm tractors, with a total driving speed range from about 1 km/h to about 50 km/h, with a speed step of about 1.2 with in main speed range from about 4 km/h to about 12 km/h, with a speed step of about 1.4 within a crawl speed range and a transport speed range, and with a minimum of speeds, gears, claw clutches and only two power shiftable friction clutches.

The invention also provides a reduction in size and cost of the two friction clutches. Because the two friction clutches are disposed on a main axis of the transmission they need only transmit the torque of the drive motor. Therefore, such clutches may be small. Further, the cost of the two friction clutches is reduced since they have common components.

Accordingly, the invention provides: a lower range of travel speed with large progressive ratios, a medium range of travel speed with small progressive ratios and an upper range of travel speed with large progressive ratios.

That is particularly advantageous for a tractor which must produce the greatest part of its work in a medium range of travel speed between 4 km/h and 12 km/h. In this usual travel speed range such a tractor is to have a high degree of performance-service, defined as the ratio of the actual performance to the maximum performance, and/or a high effective degree of operation, defined as the ratio of the useful work to consumption of fuel, while the degree of service and the degree of effectiveness in the case of travel speeds below 4 km/h and above 12 km/h are less important.

The degree of performance-service in the usual travel speed range is very high especially since the output shaft is then connected directly with a second auxiliary shaft.

The invention makes it possible to have for each forward speed a reverse speed and for each forward range a reverse range, because the reverse gearset of the reversing gear may form a reversing rpm for each forward rpm of the output shaft. The reversing rpm may be smaller, equal to or larger than the pertinent forward rpm because the number of teeth of the idler on the output shaft may be freely selectable within wide limits and the numer of teeth of the reverse gear may be selected.

The arrangement provides three range gear groups and a reversing gear group with only three sets of gears having only eight gears.

In construction, a power take off is disposed on the driven side of the gearing at low cost since the drive shaft may be mounted in three hollow intermediate shafts all on a common axis.

Construction cost is particularly low because components may be designed identically for the two friction clutches and two intermediate shafts, and thus a greater number of production pieces may be achieved for many construction parts at reduced costs.

A power path take off disposed on the driving side may be made at particularly low costs because the output shaft is mounted in a hollow second auxiliary shaft. In a motor vehicle with a main drive shaft an additional drive shat may thus be driving in a particularly advantageous manner, for example, a live steering shaft in a tractor.

Construction costs may be reduced further since the number of gears and gear sets is reduced an thus the overall length and weight of the transmission.

The construction has only twelve gear steps for a very large overall gear span sufficient, for example for an overall travel speed range of 1.9 to 38 km/h with small progressive ratios of 1.2 to 1.25 between 4.0 and 10.5 km/h. As a result of small numbers of teeth and thus small diameters of the gears, the cross section bulk of the gearing is small.

In another form of the invention gearing is made for usual tractor speed range with only twelve gear steps, only seven gears sets consisting of only twenty gears for a very large total gear span sufficient for example for total travel speed range of 1.4 to 34.5 km/h with small progressive ratios of 1.22 to 1.26 between 0.4 and 11.8 km/h. As a result of the low number of gear sets, the construction length of the gearing is small.

Finally, in a third form of the invention only eighteen gear steps are used, nine gear sets consisting of only twenty-six gears, for a very large total gear sufficient for an overall travel speed range of 0.9 to 53 km/h with a small progressive ratios of 1.185 to 1.225 between 3.7 and 12.8 km/h. As a result of the low number of gear sets, the length of construction of the gearing remains advantageously small.

The invention features gearing for a motor vehicle wherein gear change under load may be executed quickly and free of jolts with little manual operating effort. As a result, a high degree of performance-service and a high degree of operating effectiveness is achieved with the equipment and the operator protected from harmful excessive stress.

A detailed description of the invention now follows in conjunction with the appended drawings in which.

Figure 1:
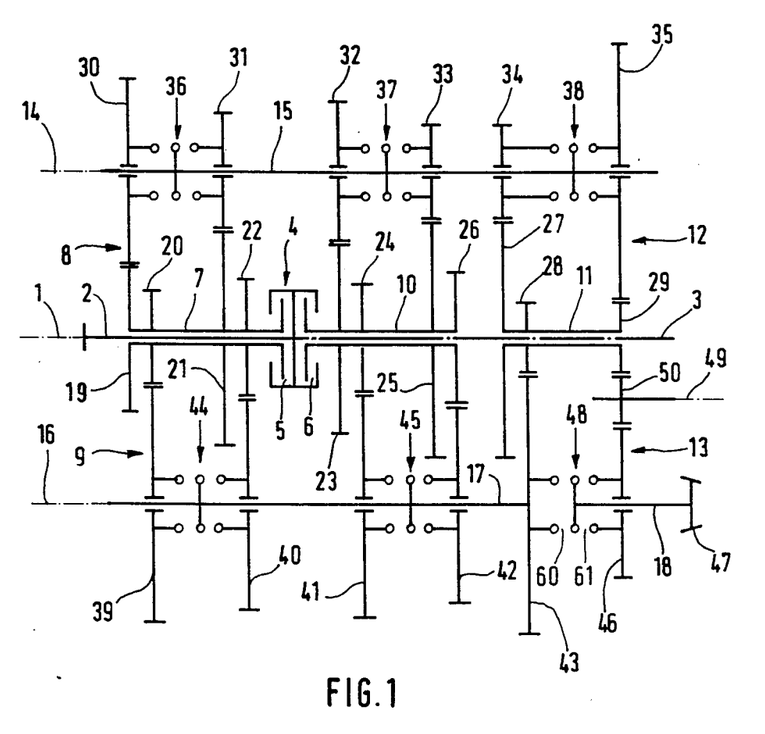
FIG. 1 shows symbolically a first embodiment of gearing with twelve forward speeds and twelve reverse speeds.

Refering to FIG. 1, a drive shaft 2, a dual coupling 4 with a first friction clutch 5 and a second friction clutch 6, an a first intermediate shaft7 of a first part 8 of a main gearing 8, 9, a second intermediate shaft 10 of a second part 9 of the main gearing 8, 9 and a third intermediate shaft 11 are incorporated in a main shaft 1 which intermediate shaft belongs to a range group gearing 12 as well as to a reversing gear group 13. Three intermediate shafts 7, 10, 11 are hollow shafts. The drive shaft 2 passes through the three hollow intermediate shafts 7, 10, 11 up to the output side 4 of the gearing and there forms a power take off 3.

On a first auxiliary axle 14 a first auxiliary shaft 15 has been disposed.

On a second auxiliary shaft 16 a second auxiliary shaft 17 and an output shaft 18 have been disposed.

The first intermediate shaft 7 carries four fixed gears 19, 20, 21, 22 as driving gears 19, 20, 21, 22. The second intermediate shaft 10 carries four fixed gears 23, 24, 25, 26 as driving gears 23, 24, 25, 26. The third intermediate shaft 11 carries three fixed gears 27, 28, 29 as driving or driven gears 27, 28, 29.

The first secondary shaft 15 carries six idlers 30, 31, 32, 33, 34, 35 as driven gears 30, 31, 32, 33, 34, 35 and three dual synchromesh switch couplings 36, 37, 38. The second auxiliary shaft 17 carries four idlers 39, 40, 41, 42, as driven gears 39, 40, 41, 42, a fixed gear 43 as a driving or driven gear 43 and two dual synchromesh switch couplings 44, 45. The output shaft 18 carries an idler 46 as a driven gear 46, a conical pinion 47 as a driving gear 47 and a dual synchromesh switch coupling 48.

Dual coupling 48 consists of a respective first and second synchronized claw clutch 60, 61. The first claw clutch 60 connects the second auxiliary shaft 17 directly to the output shaft 18 and thus forms an intermediate gear range additional to the slow and fast gear ranges of the range group gearing 12, and also forms a forward gear set of a reversing gearing 13.

The second claw clutch 61 connects the idler gear 46 with the output shaft and, together with an idler reversing gear 50 on a third auxiliary axis 49, forms a reverse gear set of the reversing gearing 13.

On a third auxiliary axle 49, a reversing gear 50 has been disposed. The reversing gear 50 meshes with the fixed gear 29 and the idler 46. Furthermore, the following mesh with one another:

fixed gear 19 and idler 30
fixed gear 20 and idler 39
fixed gear 21 and idler 31
fixed gear 22 and idler 40
fixed gear 23 and idler 32
fixed gear 24 and idler 41
fixed gear 25 and idler 33
fixed gear 26 and idler 42
idler 34 and fixed gear 27
fixed gear 43 and fixed gear 28
idler 35 and fixed gear 29

The fixed gears 19, 21, 23, 25 and the idlers 30, 31, 32, 33 constitute a first part 8 of the main gearing 8, 9 with four gear steps with large progressive ratios.

The fixed gears 20, 22, 24, 26 and the idlers 39, 40, 41, 42 constitute a second part 9 of the main gearing 8, 9 with four gear steps with small progressive ratios.

The idlers 34, 35 and the fixed gears 27, 29 constitute a range group gearing 12.

The fixed gears 28, 29, 43, the reversing gear 50 and the idler 46 constitute a reversing gear 13.

The fixed gears and the idlers have the following number of teeth:
fixed gear 19, thirty-five
fixed gear 20, twenty
fixed gear 21, forty-eight
fixed gear 22, twenty-six
fixed gear 23, forty-one
fixed gear 24, twenty-three
fixed gear 25, fifty-one
fixed gear 26, twenty-nine
fixed gear 27, fifty
fixed gear 28, sixteen
fixed gear 29, sixteen
idler 30, forty
idler 31, twenty-six
idler 32, thirty-two
idler 33, twenty-two
idler 34, twenty-five
idler 35, fifty-nine
idler 39, fifty-four
idler 40, forty-nine
idler 41, fifty-two
idler 42, forty-five
fixed gear 43, fifty-nine
idler 46, fifty-one The dual coupling 4 has three shifting positions:
it connects the drive shaft 2 by way of one of its friction couplings 5 or 6 with one of the two pertinent intermediate shafts 7 or 10 or
it separates the drive shaft 2 completely from the rest of the gearing.

In a similar manner, every dual synchromesh switch coupling 36, 37, 38, 44, 45, 48 has three shifting positions:
it connects its secondary shaft 15 or 17 or its output shaft 18 with one of the two pertinent gears or
it separates its secondary shaft 15 or 17 or its output shaft 18 completely from the two pertinent gears.

The drive shaft 2 is connected with a motor, especially a combustion motor not shown. The output shaft 18 is connected with a drive axle not shown of a vehicle not shown, especially a tractor.

In the first gear, the power flows from the drive shaft 2 by way of the friction clutch 5, the intermediate shaft 7, the fixed gear 19, the idler 30, the coupling 36, the auxiliary shaft 15, the coupling 38, the idler 34, the fixed gear 27, the intermediate shaft 11, the fixed gear 28, the fixed gear 43 and the coupling 48 to the output shaft 18.

In the second gear, the power flows from the drive shaft 2 by way of the friction clutch 6, the intermediate shaft 10, the fixed gear 23, the idler 32, the coupling 37, the auxiliary shaft 15, the coupling 38 and from there further, as in the first gear, to the output shaft 18.

In the third gear, the power flows from the drive shaft 2 by way of the friction clutch 5, the intermediate shaft 7, the fixed gear 21, the idler 31, the coupling 36, the auxiliary shaft 15, the coupling 38 and from there further, as in the first gear, to the output shaft 18.

In the fourth gear, the power flows from the drive shaft 2 by way of the friction clutch 6, the intermediate shaft 10, the fixed gear 25, the idler 33, the coupling 37, the auxiliary shaft 15, the coupling 38 and from there further, as in the first gear, to the output shaft 18.

In the fifth gear, the power flows from the drive shaft 2 by way of the friction clutch 5, the intermediate shaft 7, the fixed gear 20, the idler 39, the coupling 44, the auxiliary shaft 17 and the coupling 48 to the output shaft 18.

In the sixth gear, the power flows from the drive shaft 2 by way of the friction clutch 6, the intermediate shaft 10, the fixed gear 24, the idler 41, the coupling 45, the auxiliary shaft 17 and the coupling 48 to the output shaft 18.

In the seventh gear, the power flows from the drive shaft 2 by way of the friction clutch 5, the intermediate shaft 7, the fixed gear 22, the idler 40, the coupling 44, the auxiliary shaft 17 and the coupling 48 to the output shaft 18.

In the eight gear, the power flows from the drive shaft 2 by way of the friction clutch 6, the intermediate shaft 10, the fixed gear 26, the idler 42, the coupling 45, the auxiliary shaft 17 and the coupling 48 to the output shaft 18.

In the nineth gear, the power flows from the drive shaft 2 by way of the friction clutch 5, the intermediate shaft 7, the fixed gear 19, the idler 30, the coupling 36, the auxiliary shaft 15, the coupling 38, the idler 35, the fixed gear 29, the hollow shaft 11, the fixed gear 28, the fixed gear 43 and the coupling 48 to the output shaft 18.

In the tenth gear, the power flows from the drive shaft 2 by way of the friction clutch 6, the intermediate shaft 10, the fixed gear 23, the idler 32, the coupling 37, the auxiliary shaft 15, the coupling 38 and from there further, as in the nineth gear, to the output shaft 18.

In the eleventh gear, the power flows from the drive shaft 2 by way of the friction clutch 5, the intermediate shaft 7, the fixed gear 21, the idler 31, the coupling 36, the auxiliary shaft 15, the coupling 38 and from there further, as in the nineth gear, to the output shaft 18.

In the twelfth gear, the power flows from the drive shaft 2 by way of the friction clutch 6, the intermediate shaft 10, the fixed gear 25, the idler 33, the coupling 37, the auxiliary shaft 15, the coupling 38 and from there further, as in the nineth gear, to the output shaft 18.

In the first reverse gear, the power flows from the drive shaft 2, as in the first gear, to the intermediate shaft 11 and from there further by way of the fixed gear 29, the reverse gear 50, the idler 46 and the coupling 48 to the output shaft 18.

In the second reverse gear, the power flows from the drive shaft 2, as in the second gear, to the intermediate shaft 11 and from there further, as in the first reverse gear, to the output shaft 18.

In the third reverse gear, the power flows from the drive shaft 2, as in the third gear, to the intermediate shaft 11 and from there further, as in the first reverse gear, to the output shaft 18.

In the fourth reverse gear, the power flows from the drive shaft 2, as in the fourth gear, to the intermediate shaft 11 and from there further, as in the first reverse gear, to the output shaft 18.

In the fifth reverse gear, the power flows from the drive shaft 2, as in the fifth gear, to the auxiliary shaft 17, from there further by way of the fixed gear 43 and the fixed gear 28 to the intermediate shaft 11 and from there further, as in the first reverse gear, to the output shaft 18.

In the sixth reverse gear, the power flows from the drive shaft 2, as in the sixth gear, to the auxiliary shaft 17 and from there further, as in the fifth reverse gear, to the output shaft 18.

In the seventh reverse gear, the power flows from the drive shaft 2, as in the seventh gear, to the auxiliary shaft 17 and from there further, as in the fifth reverse gear, to the output shaft 18.

In the eight reverse gear, the power flows from the drive shaft 2, as in the eight gear, to the auxiliary shaft 17 and from there further, as in the fifth reverse gear, to the output shaft 18.

In the nineth reverse gear, the power flows from the drive shaft 2, as in the nineth gear, to the intermediate shaft 11 and from there further, as in the first reverse gear, to the output shaft 18.

In the tenth reverse gear, the power flows from the drive shaft 2, as in the tenth gear, to the intermediate shaft 11 and from there further, as in the first reverse gear, to the output shaft 18.

In the eleventh reverse gear, the power flows from the drive shaft 2, as in the eleventh gear, to the intermediate shaft 11 and from there further, as in the first reverse gear, to the output shaft 18.

In the twelfth reverse gear, the power flows from the drive shaft 2, as in the twelfth gear, to the intermediate shaft 11 and from there further, as in the first reverse gear, to the output shaft 18.

With the cited number of teeth—in the case of an equal number of rotations of the drive shaft 2—the output shaft 18 rotates in the twelfth gear/reverse gear twenty times as fast as in the first gear/reverse gear. In other words: the total gear jump amounts to twenty. The progressive ratios from one gear to the other gear amount to:

first/second gear, 1.45
second/third gear, 1.45
third/fourth gear, 1.25
fourth/fifth gear, 1.20
fifth/sixth gear, 1.20
sixth/seventh gear, 1.20
seventh/eight gear, 1.20
eight/nineth gear, 1.38
nineth/tenth gear, 1.45
tenth/eleventh gear, 1.45
eleventh/twelfth gear, 1.25

A vehicle with such a gearing may achieve for example the following travel speeds:

in the first gear, 1.9 km/h
in the second gear, 2.8 km/h
in the third gear, 4.0 km/h
in the fourth gear, 5.1 km/h
in the fifth gear, 6.1 km/h
in the sixth gear, 7.3 km/h
in the seventh gear, 8.7 km/h
in the eight gear, 10.5 km/h
in the nineth gear, 14.5 km/h
in the tenth gear, 21.0 km/h
in the eleventh gear, 30.4 km/h
in the twelfth gear, 38.0 km/h To start from the standstill—motor running, drive shaft 2 running, output shaft 18 stands still, vehicle stands still—first the necessary synchromesh switch couplings are closed in succession and last one of the two friction couplings, for example, for starting in the first gear:

first the coupling 48 between the output shaft 18 and the second auxiliary shaft 17, then the coupling 38 between the idler 34 and the first auxiliary shaft 15, then the coupling 36 between the first auxiliary shaft 15 and the idler 30 and last, the friction clutch 5 between the first intermediate shaft 7 and the drive shaft 2.

For a gear change from one gear ("old" gear) to an adjacent gear ("new" gear)—the drive shaft 2 runs, the output shaft 18 runs—first of all the synchronized switch couplings necessary for the "new" gear are closed, then the friction clutch necessary for the "old" gear is opened and finally the friction clutch necessary for the "new" gear is closed, for example in order to change from the eight gear to the nineth gear:

first the coupling 38 between the idler 35 and the auxiliary shaft 15 is closed, then the coupling 36 between the auxiliary shaft 15 and the idler 30 is closed, then the friction clutch 6 between the intermediate shaft 10 and the drive shaft 2 is opened and finally, the friction clutch 5 between the drive shaft 2 and the intermediate shaft 7 is closed.

The synchronized switch couplings—in the cited example the coupling 45 between the idler 42 and the auxiliary shaft 17 and the coupling 48 between the auxiliary shaft 17 and the output shaft 18—necessary for the "old" gear do not have to be opened but may remain closed. The gear change takes place only as a result of the opening and closing of the two friction clutches 5 and 6 of the dual coupling 4. In the case of a suitable control of the two friction clutches 5 and 6, it is also possible to transfer power from the drive shaft 2 to the output shaft 18 during the gear change.

Whenever one merely shifts back and forth between two gears, only the two friction clutches 5 and 6 must be operated for the gear change.

The dual coupling 4 with the two friction clutches 5, 6 and all dual synchronized switch couplings 36, 37, 38, 44, 45, 48 are operated electrohydraulically by shifting cylinders, not shown. The shifting cylinders are controlled and regulated by an electric shifting logic, not show. Shifting commands for carrying out the gear change may be given according to choice by hand or by extension, not shown, of the electronic switching logic. The extension of the electronic switching logic obtains signals from sensors, not shown, for the rpm of the torque of the drive shaft 2, the shifting positions of the dual coupling 4 and of the dual synchronized switching couplings 36, 37, 38, 44, 45, 48 and the rpm of the output shaft 18, and from this it forms switching commands to carry out the gear changes.

Figure 2:
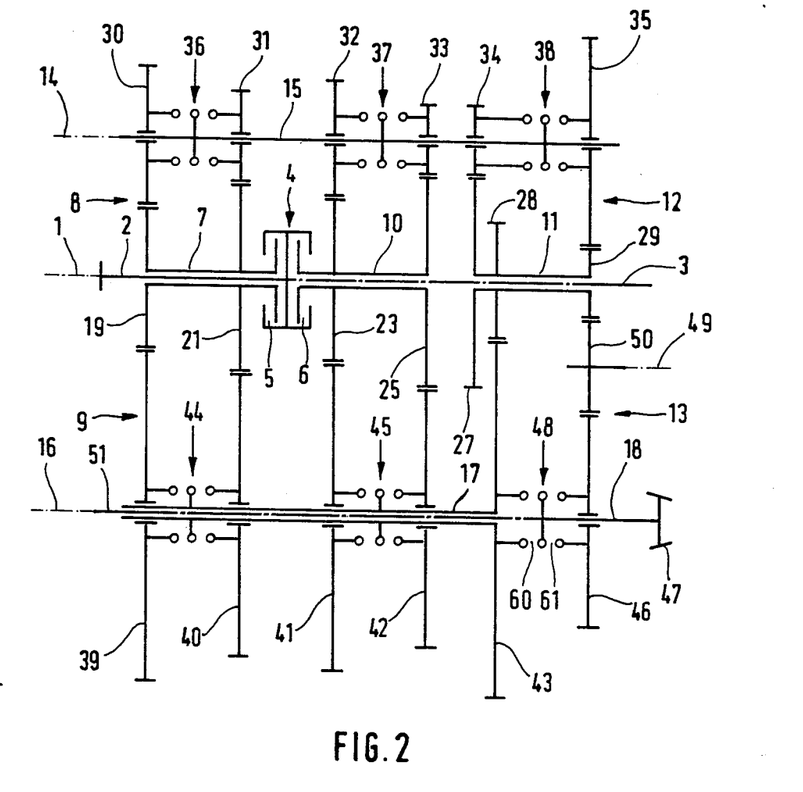
FIG. 2 shows symbolically a second embodiment of gearing with twelve foward speeds and twelve reverse speeds for the usual speed range of a tractor.

A second gearing (FIG. 2) differs from the first gearing (FIG. 1) as a result of the following characteristics:

the first intermediate shaft 7 only carries two fixed gears 19, 21 the second intermediate shaft 10 carries only two fixed gears 23, 25 the fixed gear 19 meshes with the idler 30 *and* with the idler 39 the fixed gear 21 meshes with the idler 31 *and* with the idler 40 the fixed gear 23 meshes with the idler 32 *and* with the idler 41 the fixed gear 25 meshes with the idler 33 *and* with the idler 42 the second auxiliary shaft 17 constitutes a fourth hollow shaft 17 the output shaft 18 passes right through the hollow secondary shaft 17 up to the driving side of the gearing and there constitutes a path-power take off 51 the fixed gears and idlers have the following number of teeth:

fixed gear 19, thirty
fixed gear 21, forty
fixed gear 23, thirty-five
fixed gear 25, forty-five
fixed gear 27, forty-six
fixed gear 28, twenty-seven
fixed gear 29, sixteen
idler 30, thirty-one
idler 31, twenty-one
idler 32, twenty-six
idler 33, sixteen
idler 34, fifteen
idler 35, forty-five
idler 39, seventy-three
idler 40, sixty-three
idler 41, sixty-eight
idler 42, fifty-eight
fixed gear 43, seventy-six
idler 46, forty-five in the fifth gear/reverse gear, the power flows from the drive shaft 2 by way of the friction clutch 5, the intermediate shaft 7 and the fixed gear 19 to the idler 39 and from there further, as in the fifth gear/reverse gear of the first gearing (FIG. 1), to the output shaft 18, in the sixth gear/reverse gear, the power flows from the drive shaft 2 by way of the friction clutch 6, the intermediate shaft 10 and the fixed gear 23 to the idler 41 and from there further, as in the sixth gear/reverse gear of the first gearing (FIG. 1) to the output shaft 18, in the seventh gear/reverse gear, the power flows from the drive shaft 2 by way of the friction clutch 5, the intermediate shaft 7 and the fixed gear 21 to the idler 40 and from there further, as in the seventh gear/reverse gear of the first gearing (FIG. 1), to the output shaft 18, in the eight gear/reverse gear, the power flows from the drive shaft 2 by way of the friction clutch 6, the intermediate shaft 10 and the fixed gear 25 to the idler 42 and from there further, as in the eight gear/reverse gear of the first gearing (FIG. 1), to the output shaft 18.

With the cited number of teeth—in the case of an equal number of rotations of the drive shaft 2—the output shaft 18 rotates in the twelfth gear/reverse gear twenty-five times as fast as in the first gear/reverse gear. In other words, the total gear jump amounts to twenty-five. The progressive ratios from gear to gear amount to:

first/second gear, 1.39
second/third gear, 1.41
third/fourth gear, 1.47
fourth/fifth gear, 1.26
fifth/sixth gear, 1.25
sixth/seventh gear, 1.23
seventh/eight gear, 1.22
eight-nineth gear, 1.25
nineth/tenth gear, 1.39
tenth/eleventh gear, 1.41
eleventh/twelfth gear, 1.47

Figure 3:
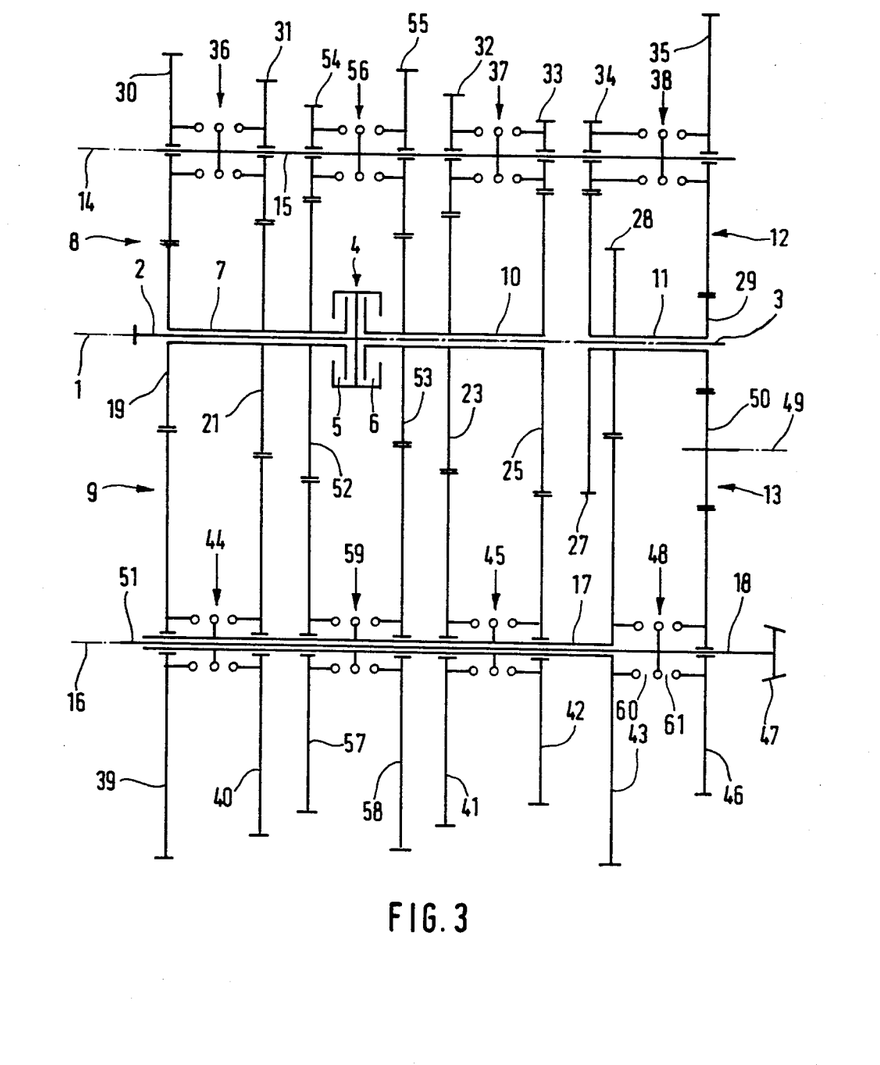
FIG. 3 shows symbolically a third gearing embodiment with eighteen forward speeds and eighteen reverse speeds.

A vehicle with such a gearing may for example reach the following travel speeds:

in the first gear, 1.35 km/h
in the second gear, 1.90 km/h
in the third gear, 2.65 km/h
in the fourth gear, 3.90 km/h
in the fifth gear, 4.90 km/h
in the sixth gear, 6.20 km/h
in the seventh gear, 7.60 km/h
in the eight gear, 9.30 km/h
in the nineth gear, 11.60 km/h
in the tenth gear, 16.20 km/h
in the eleventh gear, 22.80 km/h
in the twelfth gear, 33.70 km/h A third gearing (FIG. 3) differs from the second gearing (FIG. 2) by the following characteristics:

the first intermediate shaft 7 carries three fixed gears 19, 21, 52 the second intermediate shaft 10 carries three fixed gears 53, 23, 25 on the first auxiliary shaft 15 additionally two idlers 54, 55 and a dual synchronized switch coupling 56 are disposed on the second auxiliary shaft 17 additionally two idlers 57, 58 and a dual synchronized switch coupling 59 are disposed the fixed gear 52 meshes with the idler 54 *and* with the idler 57 the fixed gear 53 meshes with the idler 55 *and* with the idler 58 the fixed gears and idlers have the following numbers of teeth:

fixed gear 19, thirty-seven
fixed gear 21, forty-seven
fixed gear 52, fifty-seven
fixed gear 53, forty-two
fixed gear 23, fifty-two
fixed gear 25, sixty-two
fixed gear 27, sixty-two
fixed gear 28, thirty-two
fixed gear 29, sixteen
idler 30, forty-two
idler 31, thirty-two
idler 54, twenty-two
idler 55, thirty-seven
idler 32, twenty-seven
idler 33, seventeen
idler 34, seventeen
idler 35, sixty-three
idler 39, eighty-two
idler 40, seventy-two
idler 57, sixty-two
idler 58, seventy-seven
idler 41, sixty-seven
idler 42, fifty-seven
fixed gear 43, eighty-seven
idler 46, forty-three in the first gear, the power flows from the drive shaft 2 to the output shaft 18 as in the first gear of the first gearing (FIG. 1) and of the second gearing (FIG. 2), in the second gear, the power flows from the drive shaft 2 by way of the friction clutch 6, the intermediate shaft 10, the fixed gear 53, the idler 55 and the coupling 56 to the auxiliary shaft 15 and from there further as in the second gear of the first gearing (FIG. 1) and of the second gearing (FIG. 2), to the output shaft 18, in the third gear, the power flows from the drive shaft 2 to the output shaft 18 as in the third gear of the first gearing (FIG. 1) and of the second gearing (FIG. 2), in the fourth gear, the power flows from the drive shaft 2 to the output shaft 18 as in the second gear of the first gearing (FIG. 1) and of the second gearing (FIG. 2), in the fifth gear, the power flows from the drive shaft 2 by way of the friction clutch 5, the intermediate shaft 7, the fixed gear 52, the idler 54 and the coupling 56 to the auxiliary shaft 15 and from there further as in the first gear of the first gearing (FIG. 1) and of the second gearing (FIG. 2) to the output shaft 18, in the sixth gear, the power flows from the drive shaft 2 to the output shaft 18 as in the fourth gear of the first gearing (FIG. 1) and of the second gearing (FIG. 2), in the seventh gear, the power flows from the drive shaft 2 to the output shaft 18 as in the fifth gear of the second gearing (FIG. 2), in the eight gear, the power flows from the drive shaft 2 by way of the friction clutch 6, the intermediate shaft 10, the fixed gear 53, the idler 58 and the coupling 59 to the auxiliary shaft 17 and from there further as in the fifth gear of the first gearing (FIG. 1) and of the second gearing (FIG. 2) to the output shaft 18, in the nineth gear, the power flows from the drive shaft 2 to the output shaft 18 as in the seventh gear of the second gearing (FIG. 2), in the tenth gear, the power flows from the drive shaft 2 to the output shaft 18 as in the sixth gear of the second gearing (FIG. 2), in the eleventh gear, the power flows from the drive shaft 2 by way of the friction clutch 5, the intermediate shaft 7, the fixed gear 52, the idler 57 and the coupling 59 to the auxiliary shaft 17 and from there further as in the fifth gear of the second gearing (FIG. 2) to the output shaft 18, in the twelfth gear, the power flows from the drive shaft 2 to the output shaft 18 as in the eight gear of the second gearing (FIG. 2), in the thirteenth gear, the power flows from the drive shaft 2 to the output shaft 18 as in the nineth ger of the first gearing (FIG. 1) and of the second gearing (FIG. 2) to the output shaft 18, in the fourteenth gear, the power flows from the drive shaft 2 by way of the friction clutch 6, the intermediate shaft 10, the fixed gear 53, the idler 55 and the coupling 56 to the auxiliary shaft 15 and from there further as in the nineth gear of the first gearing (FIG. 1) and of the second gearing (FIG. 2) to the output shaft 18, in the fifteenth gear, the power flows from the drive shaft 2 to the output shaft 18 as in the eleventh gear of the first gearing (FIG. 1) and of the second gearing (FIG. 2) to the output shaft 18, in the sixteenth gear, the power flows from the drive shaft 2 to the output shaft 18 as in the tenth gear of the first gearing (FIG. 1) and of the second gearing (FIG. 2), in the seventeenth gear, the power flows from the drive shaft 2 by way of the friction clutch 5, the intermediate shaft 7, the fixed gear 52, the idler 54 and the coupling 56 to the auxiliary shaft 15 and from there further as in the nineth gear of the first gearing (FIG. 1) and of the second gearing (FIG. 2) to the output shaft 18, in the eighteenth gear, the power flows from the drive shaft 2 to the output shaft 18 as in the twelfth gear of the first gearing (FIG. 1) and of the second gearing (FIG. 2), in eighteen reverse gears—from the first reverse gear to the eighteenth reverse gear—the power flows from the drive shaft 2 as in the corresponding forward gears—from the first gear up to the eighteenth gear—to the intermediate shaft 11 and from there further as in the first reverse ger of the first gearing (FIG. 1) and of the second gearing (FIG.

2) by way of the fixed gear 29, the reverse toothed gear 50, the idler 46 and the coupling 48 to the output shaft 18.

With the given number of teeth in the case of the same number of rotations of the drive shaft 2 the output shaft 18 rotates in the eighteenth gear/reverse gear approximately 60 times as fast as in the first gear/reverse gear. In other words, the total gear jump amounts to about 60, the progressive ratios from gear to gear amount to:

first/second gear, 1.29
second/third gear, 1.295
third/fourth gear, 1.31
fourth/fifth gear, 1.35
fifth/sixth gear, 1.405
sixth/seventh gear, 1.225
seventh/eight gear, 1.21
eight/nineth gear, 1.20
nineth/tenth gear, 1.19
tenth/eleventh gear, 1.185
eleventh/twelfth gear, 1.185
twelfth/thirteenth gear, 1.185
thirteenth/fourteenth gear, 1.29
fourteenth/fifteenth gear, 1.295
fifteenth/sixteenth gear, 1.31
sixteenth/seventeenth gear, 1.35
seventeenth/eighteenth gear, 1.405

A vehicle with such a gearing may for example reach the following travel speeds:

in the first gear 0.89 km/h
in the second gear 1.15 km/h
in the third gear 1.49 km/h
in the fourth gear 1.95 km/h
in the fifth gear 2.62 km/h
in the sixth gear 3.68 km/h
in the seventh gear 4.51 km/h
in the eight gear 5.45 km/h
in the nineth gear 6.53 km/h
in the tenth gear 7.76 km/h
in the eleventh gear 9.20 km/h
in the twelfth gear 10.88 km/h
in the thirteenth gear 12.77 km/h
in the fourteenth gear 16.45 km/h
in the fifteenth gear 21.25 km/h
in the sixteenth gear 27.90 km/h
in the seventeenth gear 37.60 km/h
in the eighteenth gear 52.80 km/h

I claim:

1. In a powershiftable transmission wherein:
gearing transmits power from a drive shaft to an output shaft in several ratio steps through gear sets having continuously meshing gears and including synchronizing clutches and friction clutches; said transmission comprising two power paths wherein only one power path transmits power an any one time;
each power path having a friction clutch and at least one synchronizing clutch;
the transmission further comprises main gearing groups connected to the drive shaft, a range gearing group and a reverse gear connected to the ouput shaft wherein the shafts, gears and clutches of the transmission are carried essentially on a main shaft and two side shafts with the drive shaft being part of the main shaft and wherein each side shaft has at least one auxiliary shaft;
the improvement wherein:
a first friction clutch (5) and a second friction clutch (6) are disposed on the drive shaft (2), said first and second friction clutches (5, 6) being constructed as a dual coupling having a common driven component (4),
a first intermediate shaft (7) and a second intermediate shaft (10) are disposed concentric to said main shaft (1),
said first intermediate shaft (10) carries gears (19, 20, 21, 22) fixed thereon,
said second intermediate shaft (10) carries gears (23, 24, 25, 26) fixed thereon,
said first intermediate shaft (7) may be connected by way of the first friction clutch (5) with said drive shaft (2),
said second intermediate shaft (10) may be connected by way of the second friction clutch (6),
idler gears (30, 31, 32, 33) on a first auxiliary shaft (15) meshed with fixed gears (19, 21) on said first intermediate shaft (7) and fixed gears (23, 25) on said second intermediate shaft (10) providing a first range of gear steps with large progressive ratios,
idler gears (39, 40, 41, 42) on a second auxiliary shaft (17) meshed with fixed gears (20, 22) on said first intermediate shaft (7) and fixed gears (24, 26) on said second intermediate shaft (10) providing a second range of gear steps with a small progressive ratio,
another idler gear (34) on said first auxiliary shaft (15) meshing with a gear (27) fixed on a third intermediate shaft (11) providing a slow range;
a fixed gear (43) on said second auxiliary shaft (17) meshed with a second fixed gear (28) on said third intermediate shaft (11) providing a medium range;
a further idler gear (35) on said first auxiliary shaft (15) meshed with another gear (29) fixed on said third intermediate shaft (11) providing a fast range;
an output shaft (18) is disposed co-axially with said second auxiliary shaft (17) and by way of a synchronized clutch (48) directly connectable with said second auxiliary shaft (17);
said second fixed gear (28) on said third intermediate shaft (11) and the fixed gear (43) on said second auxiliary shaft (17) together form the forward-gear set (28/43) of a reversing gear group (13);
the fixed gear (29) on the third intermediate shaft (11), a reversing gear (50) on an auxiliary shaft (49) and an idler (46) on the output shaft (18) constitute the reversing gear set (29/50/46) of the reversing gear group (13);
the number of teeth on the idler on the output shaft may be freely selectable within wide limits.

2. The transmission of claim 1 wherein:
said third intermediate shaft (11) is disposed co-axially with said second intermediate shaft (10);
the three intermediate shafts (7, 10, 11) form three hollow shafts;
the drive shaft (2) passes through the three hollow intermediate shafts and constitutes a motor power take off (3) on the output side.

3. The transmission of claim 2 wherein:
said two friction clutches (5, 6) are disposed axially between said first intermediate shaft (7) and said second intermediate shaft (10).

4. The transmission of claim 3 wherein:
said second auxiliary shaft (17) constitutes a hollow shaft;

the output shaft (18) passes through the hollow shaft and provides a power take off (51) on the input side.

5. The transmission of claim 1 wherein: at least one gear (19) fixed on an intermediate shaft (7) meshes with an idler gear (30) of said first auxiliary shaft (15) as well as with an idler gear 39 on said second auxiliary shaft (17).

6. The transmission of claim 1 wherein:
the number of teeth of the meshing gears between said first intermediate shaft (7) and the first auxiliary shaft (15) amount to: 35/40, 48/26, 41/32, 51/22; and
between said second intermediate shaft (10) and said second auxiliary shaft (17): 20/54, 26/49, 23/52, 29/45; and
between said first auxiliary shaft 15 and said third intermediate shaft (11): 25/20, 59/16; and in the reverse gear (13): 16/59, 16/51.

7. The transmission of claim 1 wherein:
the number of teeth of the meshing gears between said first intermediate shaft (7) and the first auxiliary shaft (15) amount to: 30/31, 40/21, 35/26, 45/16; and
between said first intermediate shaft (7) and said second auxiliary shaft (17): 30/73, 40/63, 35/68, 45/58; and
between said first intermediate shaft (7) and said first auxiliary shaft (15): 15/46, 45/16; and
in the reverse gear (13): 27/76, 16/45.

8. The transmission of claim 1 wherein:
the number of teeth on the meshing gears between said first intermediate shaft (7) and said first auxiliary shaft (15) amount to: 37/42, 47/32, 57/22, 42/37, 52/27, 62/17; and
between said first intermediate shaft (7) and said second auxiliary shaft (17): 37/82, 47/72, 57/62, 42/77, 52/67, 62/57; and
in the range gearing group (12): 17/62, 63/16; and in the reverse gear (13): 32/87 and 16/43.

9. The transmission of claim 1 wherein:
all clutches shift with auxiliary power; and
a shifting logic controls the auxiliary power for opening and closing of the clutches in every shifting process.

10. Powershift gearbox for vehicles, especially farm tractors, comprising:
a main gear set consisting of a first section (8) and a second section (9), each comprising at least four speeds, including a range group gear set (12), and a reversing gear set (13) each arranged in series along respective power flow paths;
wherein the reversing gear set 13 can effect a reverse speed out of each forward speed;
the gearbox having gear sets consisting of constant mesh gears (19 . . . 35, 39 . . . 43, 46, 47, 50) and having synchronized double claw clutches (36 . . . 38, 44, 45, 48) and having a first and second power shiftable friction clutch (5, 6); wherein
the gearbox transmits power from an input shaft (2) to an output shaft (18) in each speed via at least one gear set (24, 41), at least two claw clutches (44, 45) and one friction clutch (6);
the gearbox having a first power branch and a second power branch;
the first power branch including the first friction clutch (5) and respective gear sets and claw clutches operative to effect all odd speeds;
the second power branch having the second friction clutch (6) and respective gear sets and claw clutches operative to effect all even speeds;
whereby when shifting from an odd speed to an even speed, the first friction clutch (5) and respective claw clutches operative to effect an odd speed remain engaged until all claw clutches effecting an even speed are also engaged, whence the first friction clutch (5) is disengaged and the second friction clutch (6) is engaged;
whereby when shifting from an even speed to an odd speed, the second friction clutch (6) and respective claw clutches operative to effect an even speed remain engaged until all claw clutches operative to effect an odd speed are also engaged, whence the second friction clutch (6) is disengaged and the first friction clutch (5) is engaged;
each gearshift between immediately neighboring speeds being shiftable under full load whereby the gearbox can transmit power continuously even during gearshifting;
the friction clutches (5, 6), the double claw clutches (36 . . . 38, 44, 45, 48) and the gears (19 . . . 35, 39 . . . 43, 46, 47, 50) being disposed essentially on a main axis 1 and on a first and second counter axis (14, 16);
the improvements wherein: on the main axis 1 are disposed the input shaft (2) of the gearbox, the first and the second friction clutches (5, 6), and a first, a second and a third intermediate shaft (7, 10, 11); wherein the first friction clutch (5) is operative to connect the input shaft (2) with the first intermediate shaft (7); the first intermediate shaft (7) carries fixed gears (19 . . . 22);
the fixed gears (19 . . . 22) effect driving gears in the first power branch, for the first and the second sections (8, 9) of the main gear set and the second friction clutch (6) is operative to connect the input shaft (2) with the second intermediate shaft (10) wherein
the second intermediate shaft (10) carries fixed gears (23 . . . 26);
the fixed gears (23 . . . 26) effect driving gears in the second power branch, for the first and the second section (8, 9) of the main gear set;
the third intermediate shaft (11) effects a connection between the range group gear set (12) and the reversing gear set (13) and carries fixed gears (27 . . . 29);
the fixed gears (27 . . . 29) effect gears of the range group gear set (12) and of the reversing gear set (13);
on the first counter axis (14) are a first auxiliary shaft (15) with double claw clutches (36, 37), with respective idler gears (30 . . . 33) and with a another double claw clutch (38) and respective idler gears (34, 35);
the first mentioned idler gears (30 . . . 33) effect driven gears of the first section (8) of the main gear set;
the double claw clutches (36, 37) are operative to connect the latter idler gears (30 . . . 33) with the first auxiliary shaft (15);
the second mentioned idler gears (34, 35) effect driving gears of the range group gear set (12);
the said other double claw clutch (38) is operative to connect said second mentioned idler gears (34, 35) with the first auxiliary shaft (15);

the first auxiliary shaft (15) effects an output shaft of the first section (8) of the main gear set and effects an input shaft of the range group gear set (12);

the first section (8) of the main gear set effects a series of speeds with wide gear ratio steps;

the first section (8) and the range group gear set (12) together effect a slow speed range and a fast speed range, with wide gear ratio steps in each range;

on the second counter axis (16) is disposed a second auxiliary shaft (17) with double claw clutches (44, 45), having respective idler gears (39 . . . 42) and having a fixed gear (43); the output shaft (18) of the gearbox having a double claw clutch (48) thereon consisting of a first and a second claw clutch (60, 61) and having an idler gear (46) thereon;

the idler gears (39 . . . 42) of double claw clutches (44, 45) on said second auxiliary shaft (17) effecting driven gears of the second section (9) of the main gear set;

the latter double claw clutches (44, 45) are operative to connect the respective idler gears (39 . . . 42) with the second auxiliary shaft (17);

the fixed gear (43) on the second auxiliary shaft (17) meshes with fixed gear (28) of the third intermediate shaft (11);

the output shaft idler gear (46) meshes with a reversing gear (50) on a third counter axis (49);

the reversing gear (50) also meshes with a fixed gear (29) of the third intermediate shaft (11);

the first claw clutch (60) is operative to rapidly connect the output shaft (18) with the second counter shaft (17);

the second claw clutch (61) is operative to connect the output shaft idler gear (46) with the output shaft (18);

the first claw clutch (60) and the second claw clutch (61) effect a forward clutch and a reverse clutch, respectively, of the reverse gear set (13);

the second section (9) of the main gear set produces a series of speeds with narrow gear ratio steps;

the second section (9) and the first claw clutch (60) together produce a medium speed range with narrow gear ratio steps.

11. Gearbox according to claim 10, wherein the two friction clutches (5, 6) are disposed axially between the first intermediate shaft (7) and the second intermediate shaft (10); and the two friction clutches (5, 6) are structurally combined forming a double friction clutch (4);

12. Gearbox according to claim 10, wherein the third intermediate shaft (11) is disposed axially rearward of the second intermediate shaft (10);

the three intermediate shafts (7, 10, 11) being hollow shafts; and the input shaft (2) of the gearbox passes through the three hollow intermediate shafts (7, 10, 11) and is an engine driven power take off shaft at the output end of the gearbox.

13. Gearbox according to claim 10, wherein the second counter shaft (17) is a hollow shaft;

the output shaft (18) of the gearbox passes through the hollow second counter shaft (17) and is a ground driven power take off shaft at the input end of the gearbox.

14. Gearbox according to claim 10, wherein at least one fixed gear (19) of intermediate shaft (7) of the main gear set meshes with an idler gear (30) of the first counter shaft (15) as well as with an idler gear (39) of the second auxiliary shaft (17).

15. Gearbox according to claim 10, wherein the number of teeth of the driving/driven gears are:

in the first section (8) of the main gear set on the main axis (1)/first counter axis (14): 35/40, 48/26, 41/32, 51/22, in the second section 9 of the main gear set on the main axis (1)/second counter axis (16): 20/54, 26/49, 23/52, 29/45, in the range group gear set (12) on the first counter axis (14)/main axis (1): 25/50, 59/16, in the reversing gear set (13) on the main axis (1)/second counter axis (16): 16/59, 16/51.

16. Gearbox according to claim 10, wherein the number of teeth of the driving/driven gears are:

in the first section (8) of the main gear set on the main axis (1)/first counter axis (14): 30/31, 40/21, 35/26, 45/16, in the second section (9) of the main gear set on the main axis (1)/second counter axis (16): 30/73, 40/63, 35/68, 45/58, in the range group gear set (12) on the first counter axis (14)/main axis (1): 15/46, 45/16, in the reversing gear set (13) on the main axis (1)/second counter axis (16): 27/76, 16/45.

17. Gearbox according to claim 10, wherein the number of teeth of the driving/driven gears are:

in the first section (8) of the main gear set on the main axis (1)/first counter axis (14): 37/42, 47/32, 42/37, 52/27, 62/17, in the second section (9) of the main gear set on the main axis (1)/second counter axis (16): 37/82, 47/72, 57/62, 42/77, 52/67, 62/57, in the range group gear set (12) on the first counter axis (14)/main axis (1): 17/62, 63/16, in the reversing gear set (13) on the main axis (1)/second counter axis (16): 32/87, 16/43.

18. Gearbox according to claim 10, wherein servometers actuate the two friction clutches (5, 6) and all double claw clutches (36. . . 38, 44, 45, 48) and a logic device controls each servometer at each shifting action.

* * * * *